(12) United States Patent
Emery

(10) Patent No.: US 6,431,629 B1
(45) Date of Patent: Aug. 13, 2002

(54) BEDLINER WITH ANTI-SLIP UNDER LAYER

(75) Inventor: Phillip L. Emery, Portage, WI (US)

(73) Assignee: Penda Corporation, Portage, WI (US)

( * ) Notice: Subject to any disclaimer, the term of this patent is extended or adjusted under 35 U.S.C. 154(b) by 0 days.

(21) Appl. No.: 09/144,663

(22) Filed: Sep. 1, 1998

(51) Int. Cl.⁷ .............................................. B60R 13/01
(52) U.S. Cl. ...................................................... 296/39.2
(58) Field of Search ................................. 296/39.1, 39.2

(56) References Cited

U.S. PATENT DOCUMENTS

| | | |
|---|---|---|
| 3,578,375 A | 5/1971 | Finefrock |
| 4,083,595 A | 4/1978 | Maier |
| 4,101,704 A | 7/1978 | Hiles |
| 4,188,058 A | 2/1980 | Resa et al. |
| 4,245,863 A | 1/1981 | Carter |
| 4,396,219 A | 8/1983 | Cline |
| 4,693,507 A | 9/1987 | Dresen et al. |
| 4,765,671 A | 8/1988 | Allen |
| 4,779,390 A | 10/1988 | Repper et al. |
| 4,801,169 A | 1/1989 | Queen et al. |
| 5,094,318 A | 3/1992 | Maeda et al. |
| 5,165,747 A | 11/1992 | Stringer et al. |
| 5,185,980 A | 2/1993 | Rydberg et al. |
| 5,360,250 A | 11/1994 | Wood et al. |
| 5,370,436 A | 12/1994 | Martindale et al. |
| 5,372,396 A | 12/1994 | Van Nahmen |
| 5,470,642 A * | 11/1995 | Egigian ...................... 428/192 |
| 5,472,760 A | 12/1995 | Norvell |
| 5,505,512 A | 4/1996 | Martindale et al. |
| 5,540,473 A | 7/1996 | Bills, Sr. |
| 5,551,742 A | 9/1996 | Martindale et al. |
| 5,597,194 A | 1/1997 | Daugherty et al. |
| 5,636,883 A | 6/1997 | Johns |
| 5,648,031 A | 7/1997 | Sturtevant et al. |
| 5,688,467 A | 11/1997 | Kelman et al. |
| 6,237,980 C1 * | 5/2001 | Miles et al. ................ 296/39.2 |

FOREIGN PATENT DOCUMENTS

WO    WO 95/04671    2/1995

OTHER PUBLICATIONS

"Want more protection from your bedline? Get a grip! " LRV–A Lancaster Colony Company, P.O. Box 150, Wapakoneta, Ohio 45895–0150, Trucking Times & Sport Utility News, May/Jun. 1998, Issue 4, vol. 9, p. 15 and cover.

Plastics Handbook, McGraw–Hill, Inc., 1994, pp. 30 and 31.*

* cited by examiner

Primary Examiner—D. Glenn Dayoan
Assistant Examiner—Jason Morrow
(74) Attorney, Agent, or Firm—Lathrop & Clark LLP

(57) ABSTRACT

A truck cargo bed liner having an anti-slip under layer to reduce rubbing between the liner and the cargo bed. The liner may further include an upper layer of anti-slip material to resist shifting of cargo during transport.

26 Claims, 1 Drawing Sheet

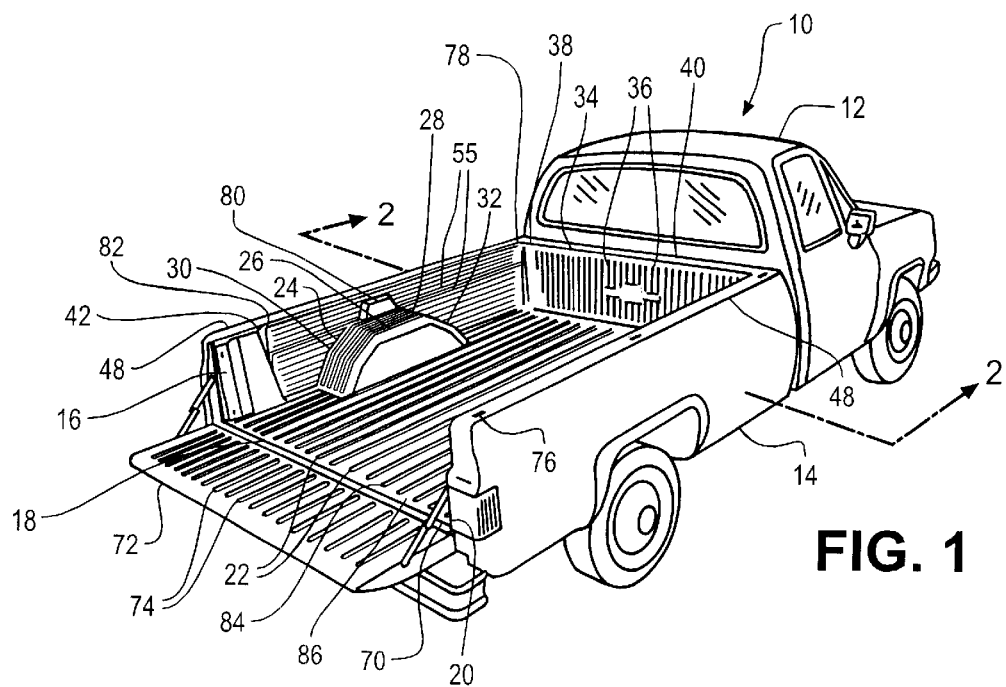
FIG. 1
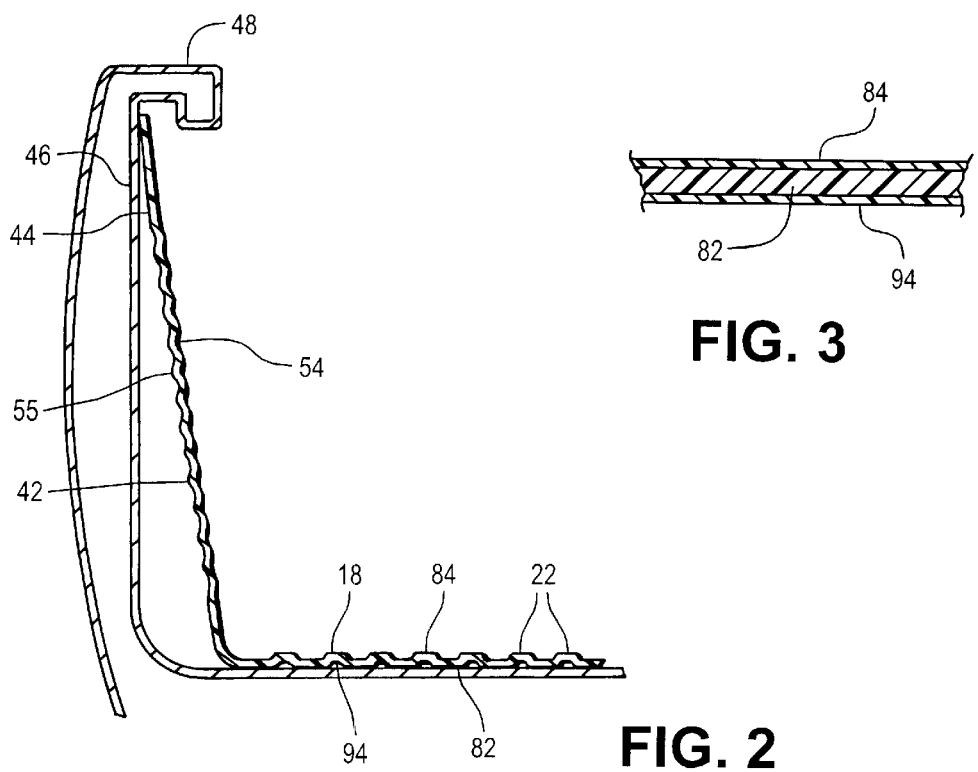
FIG. 3
FIG. 2

BEDLINER WITH ANTI-SLIP UNDER LAYER

FIELD OF THE INVENTION

This invention relates to molded plastic protective liners for pickup truck cargo beds, and in particular to liners with a non-skid undersurface that protects truck beds from damage due to rubbing by the liner.

DESCRIPTION OF THE PRIOR ART

Pickup trucks have been used for many years as working vehicles. In recent years pickup trucks have become increasingly popular as family transportation vehicles, because of their dual ability to haul passengers and cargo. The cargo bed surfaces of pickup trucks are generally finished with paint by the manufacturer. If the painted surfaces are unprotected, they can be scratched from cargo impact or deteriorated by weather or corrosives, seriously detracting from the value of the trucks. Whether a pickup truck is used as a working vehicle or as a family transportation vehicle, it is important to keep the surface of the cargo bed in a satisfactory condition.

Various cargo bed liners used to protect the surface of cargo beds are described in prior art patents. One-piece molded plastic truck liners comprising a front wall, opposing side walls and a bottom wall are shown in U.S. Pat. Nos. 4,341,412 to Wayne; 4,336,963 to Nix et al.; 4,181,349 to Nix et al.; 4,047,749 to Lambitz; 3,814,473 to Lorenzen; and 4,592,583 to Dresen. All of the above patents show plastic liners that fit in the truck cargo bed and bear on the bed floor, walls, and rails at various points of contact, either by design or due to irregular liner shapes and warping after the vacuum-formed manufacturing process. Where the liner meets the cargo bed there may be rubbing because one-piece molded plastic truck liners shift, particularly as the truck is being loaded and unloaded, and as cargo shifts during transport. As the liner shifts there may be rubbing on the surfaces of the truck cargo bed that can scuff, scratch, and remove paint and paint undercoats. When paint and paint undercoats are damaged, rusting of the truck bed may occur thereby exposing the truck bed to corrosion which adversely affects the appearance of the truck.

There are known truck cargo bed liners having anti-slip upper surface for restraining cargo during transport, loading, and unloading. The anti-slip surfaces comprise a layer having a higher co-efficient of friction than the plastic forming the liner. (See: U.S. Pat. No. 4,693,507, for example.) The non-slip layer may be coextruded with, adhered to, or thermally attached to the plastic base material before or during the liner vacuum forming process. Although non-slip upper surfaces in bedliners are effective for restraining cargo during transport, there is additional rubbing of the under side of the HDPE base material against the truck cargo bed because the cargo's weight shifts the cargo and the liner to which it is now restrained.

A need exists for a one-piece plastic protective cargo bed liner for engagement with at least a portion of the truck cargo bed which will reduce damage to the cargo bed from rubbing by the liners.

SUMMARY OF THE INVENTION

The present invention is a protective truck bed liner adapted to reduce rubbing between the liner and the truck bed. The liner includes an anti-slip under layer preferably made of a plastic material that is either coextruded with or otherwise adhered to a base sheet of plastic used to vacuum form the liner.

The under layer has a coefficient of friction high enough to reduce rubbing and thereby protect the truck cargo bed by reducing damage due to the installation of the liner. The under layer can be a composition including very low density polyethylene and very high molecular weight high density polyethylene which can be in portions of about sixty percent and forty percent, respectively. The under layer may be a composition including a polyolefin and the polyolefin may be between thirty and fifty percent of the composition and is preferably about forty percent of the composition. The under layer can be as thin as a single molecular layer of anti-skid material and is preferably at least ten thousandths of an inch thick. The under layer can be uniform thickness or selectively applied to specific areas of the liner to protect cargo bed components that are more susceptible to wear.

In addition, an upper anti-slip layer can be used and it can be of the same composition as the under layer. The upper layer can be as thin as a single molecular layer of anti-skid material and is preferably at least approximately forty thousandths of an inch thick.

It is an object of the invention to provide a plastic truck cargo bed liner having an integral, durable anti-slip under layer.

It is a further object of the invention to provide a plastic protective truck cargo bed liner having an under layer that is durable.

It is an additional object of the invention to provide a plastic protective truck cargo bed liner having an anti-slip under layer joined to at least a portion of the liner under surface.

Other objects, advantages and features of the present invention will become apparent from the following detailed description in conjunction with the accompanying drawings.

DESCRIPTION OF THE DRAWINGS

FIG. 1 is a perspective view of a cargo bed liner of the present invention installed in a pickup truck.

FIG. 2 is a fragmentary sectional view taken substantially along line 2—2 of FIG. 1.

FIG. 3 is a fragmentary sectional view of a cargo bed base sheet sandwiched by anti-slip layers.

DESCRIPTION OF THE PREFERRED EMBODIMENT

FIG. 1 illustrates a conventional pickup truck 10 having a cab 12 and a truck cargo bed 14. A preferred embodiment of the protective truck cargo bed liner 16 of the invention is installed within the truck cargo bed 14.

The truck bed liner 16 is typically formed from a base sheet of high density polyethylene (HDPE) or high molecular weight high density polyethylene (HMW-HDPE) in a single, integral unit, and has a liner bottom wall 18 which is adapted to fit on and substantially cover the full width of the truck cargo bed floor. The liner bottom wall 18 will normally have a width substantially as great as the distance between the truck side rails. As shown in FIG. 2, the liner bottom wall 18 typically contains a plurality of separate, inverted U-shaped longitudinal corrugations 22. The bottom wall 18 also has a planar apron portion 70 at its rear margin which is adapted to fit snugly against the truck cargo bed floor adjacent the rear access opening 20 to keep foreign material from entering between the liner and the truck bed.

The truck bed liner 16 also has two liner wheel wells 24 formed in the liner bottom wall 18 at opposite sides thereof. The liner wheel wells 24 are adapted to accommodate the truck cargo bed rear wheel wells (not shown). The liner wheel wells 24 have a top wall 26, inside wall 28, and two opposing end walls, one end inside wall 30 facing backward to the truck rear opening and one end wall 32 facing forward to the cab 12.

A liner front wall 34 is connected to and extends upwardly from the liner bottom wall 18. As shown in FIG. 1, the liner front wall 34 preferably contains structure such as a plurality of vertically extending corrugations 36 for stability. The liner front wall 34 has an upper margin 38 adapted to fit snugly against the truck cargo bed front wall underneath the truck front rail 40.

Two liner side walls 42 are connected to the liner bottom wall 18 and wheel wells 24 and also the liner front wall 34 at opposite sides thereof. The liner front wall 34 substantially fixes and limits the distance between the liner side walls 42 at the front end of the liner 16. As shown in FIGS. 1 and 2, each liner side wall 42 projects upwardly and outwardly from the liner bottom wall 18 and adjacent liner wheel well 24. Each liner side wall 42 preferably has structure such as a plurality of corrugations 55 for stability and an upper margin 44 which fits snugly against the corresponding truck cargo bed wall 46 beneath the corresponding truck cargo bed side rail 48. The upper margin 44 is preferably substantially co-planar with the liner side wall 42 and may be devoid of any substantial transverse flange to permit the side wall 42 to fit flush against the cargo bed wall 46, and also to permit the liner side wall 42 to bend outwardly in a limited manner, whereby the spacing of the side walls 42 near the front of the liner will be maintained by the attached front liner wall 34, but more rearwardly portions of the liner side wall 42 will be permitted to open outwardly a limited amount when not restrained within the truck cargo bed to facilitate full nesting of the liner with identical liners.

It can be seen from FIG. 1 that pick-up cargo beds may have two or three stake channels 76 spaced along each side rail 48, one at each end and sometimes one at the mid-point. These stake channels 76 are typically rectangular steel channels which extend vertically downward from the top of the side rails 48 to the floor of cargo bed, for the purpose of receiving stakes of wood or other material supporting vertically extending sides for increasing the load-containing capabilities of the truck cargo bed. Because the preferred cargo bed liner 16 extends under the truck side rails 48 all the way to the truck cargo bed side walls, the stake channel 76 would interfere with the liner side walls 42 unless means are provided to accommodate the stake channels 76. The liner side walls 42 intended for use in cargo beds with stake channels 76 preferably each include a front pocket 78, a rear pocket 82, and, if required, a side pocket 80. These side wall pockets 80 extend each side wall 42 inwardly a sufficient distance to permit it to pass around the stake channels 76 while permitting the remainder of the side wall 42 to extend outwardly to engage the truck side wall 46. The configuration of the side wall pockets 78, 80 and 82 may vary, although preferably the pockets are located and shaped to accommodate the differing stake channels of different truck cargo bed manufacturers. As with the liner side wall and wheel well surfaces, it is preferable to incline the surfaces of the pockets to permit full nesting of the liners.

While the drawings illustrate a preferred truck cargo bedliner 14 of the under rail type, the invention is equally useful and advantageous when incorporated in a truck cargo bedliner of the over rail type having flanges on the tops of the bedliner sidewalls which extend over and rest on the truck side rails in a protective manner. Examples of such over the rail type bedliners are illustrated in above-mentioned U.S. Pat. Nos. 4,341,412; 4,336,963; and 3,814,473.

A separate one-piece tailgate liner 72 may also be attached to the tailgate of the truck in a conventional manner. The tailgate liner 72 has inverted U-shaped, corrugations 74 which are vertically extending when the tailgate is closed. The corrugations 74 are similar to the corrugations 22 of the liner bottom wall. The tailgate liner 72 may also advantageously include anti-slip frictional layers as described below.

The bedliner 16 of the present invention (FIG. 3) has an undersurface that includes a base sheet 82 and an under layer 94 of an anti-slip material that reduces or eliminates rubbing between the liner 16 base sheet 82 and the cargo bed. The anti-slip under layer 94 is preferably made of a material suitable for coextrusion with the liner base sheet 82 plastic or otherwise bondable to or with the liner base sheet 82 by adhesives or thermal bonding. In any event, the under layer 94 must be securely joined to the liner base sheet 82 either by mechanical means, chemical means, or molecular interlocking between the anti-slip layer 94 and the base sheet 82.

When bedliner sheets are produced using a coextrusion process, the process beings with virgin plastic pellets or regrind from scrap bedliner materials. The pellets and/or regrind are conveyed through heated barrels by rotating screws to extrude barrels that melt the pellets and/or regrind and feeds the melted plastic in streams that converge at a die block.

Different blends of materials are fed through separate extruders to create an anti-skid or "softer" material in one layer to become the liner under layer, and a liner base sheet 82 of HDPE or HMW-HDPE. If a skid-resistant upper or interior layer 84 is desired, a third material or the same anti-skid material used in the under layer 94 can be diverted in the die block to sandwich the HDPE material in the liner base sheet 82.

As the materials melt in the heated barrels, they are fed through the die block and exit to be shaped into a continuous monolithic shape or sheet by steel rolls, such as embossing chrome rolls. The sheet cools and the outer edges are trimmed to size. The sheet is cut to length in a chopper and then stacked and stored before being used in a vacuum forming process to form a liner of a desired shape.

The thickness of the sheet and the individual coextruded layers are adjustable in the process. For example, a 230 thousandths of an inch thick sheet preferably has a ten thousandths of an inch under layer 94, a 180 thousandths of an inch base sheet 82, and a 40 thousandths of an inch interior or upper layer 84 for contacting cargo. The layers can be extremely thin and still provide anti-slip properties. Layers as thin as a single molecule thick can provide the desired properties. These thicknesses are approximated over the sheet area because the thermoforming process used to form the bedliner 16 will stretch the sheet and vary the material thickness depending on the draw conditions and final deposit location.

As stated, the base sheet 82 is typically HDPE, HMW-HDPE, or other "stiff" material to provide the liner 16 with structural integrity and impact resistance. The anti-slip upper and under layers 84 and 94 provide resistance to shifting cargo and rubbing of the cargo bed. The anti-slip layers 84 and 94 also provide impact absorbance and have a good appearance.

Preferably, the anti-slip layers 84 and 94 are about 60 percent very low density polyethylene (VLDPE), about 40 percent high molecular weight high density polyethylene (HMW-HDPE), and a small amount of colorant. The base sheet 82 is preferably 30 to 100 percent HMW-HDPE, zero to 70 percent (for an average of about 40%) regrind from the trimming process, and a small amount of colorant. These percentages are by weight. In the base sheet 82, the percentages fluctuate due to the available amount of regrind which contains various percentages of the materials used in the various layers, including small amounts of VLDPE.

A suitable HMW-HDPE is Fortiflex® G50-100 available from Solvay Polymers, Inc., 3333 Richmond Avenue, Houston, Tex. 77098-3099. A suitable VLDPE is Flexomer® Polyolefins, DFDB-1085 Natural, available from Union Carbide Corporation, Unipol Polymers, 39 Old Ridgebury Rd., Danbury, Conn. 06817-0001. Such a polyolefin is a semicrystalline ethylene copolymer with elastic properties approaching those of uncured EPM and EPD rubbers to serve as an impact modifier for polypropylene.

The thickness of the under layer 94 can be discontinuous or otherwise modified at various points or areas on the sheet to reduce cost and concentrate anti-skid materials at locations where rubbing is of greater concern due to likelihood of corrosion and affect on appearance if the liner is removed. Areas of greater concern include; the cargo bed floor, the truck rails, and the front wall. In areas of less concern, such as side walls where there is little or no liner-to-wall contact, there need not be any anti-skid material. Nonetheless, when using the coextrusion process, the layers are as uniform as practical and cover the entire sheet. Alternatively, the under layer 94 can be sprayed on using known methods which result in a discontinuous layer of hardened bubbles or droplets that form a textured surface. Known spray-on materials include: isocyanates; carbamates; ureas; and polymers and co-polymers of these materials.

As stated above, the inside surface 54 of the cargo bed liner 16 is preferably provided with an integral anti-slip surface made of an upper frictional layer 84. The upper layer 84 has a high coefficient of friction that will inhibit movement of material placed on the upper surface of the liner 16 during use. The upper layer 84 may be laminated to the upper surface of the base sheet 82 of the liner 16 during extrusion forming of the sheet prior to vacuum forming of the liner. In addition to the mix described above, suitable materials for the anti-slip layers include ethylene ethyl acetate (EEA), ethylene vinyl acetate (EVA), thermoplastic rubber (TPR), Saranex, and a modified polyolefin sold under the trademark Ren-Flex by the Ren Plastics Company. The film may be adhered to the base sheet 82 by an adhesive or by thermal attachment during the liner vacuum forming process.

Optionally, a blend of a thermoplastic rubber material sold under the trademark Kraton by Shell Oil Company, Woodbury, N.J., and a thermoplastic rubber material sold under the trademark Santoprene by Monsanto Polymers Division of Monsanto Chemical Company, St. Louis, Mo. is co-extruded as a film between approximately 10 and 35 thousandths of an inch thickness, such as 25 to 30 thousandths of an inch thick on at least portions of the liner upper surface. A preferred blend of Kraton and Santoprene in the film in approximately equal portions provides desirable anti-slip characteristics without being tacky. These and other features are disclosed in U.S. Pat. No. 4,693,507, which is incorporated herein by reference.

While the anti-slip frictional layers 84 and 94 have been illustrated and described on a preferred plastic truck body liner, it is understood that the anti-slip frictional layers of the invention may be incorporated in thermoformed plastic truck bed liners of any desired shape or style.

It is understood that the invention is not confined to the particular construction and arrangement of parts herein illustrated and described, but embraces such modified forms thereof as come within the scope of the following claims.

What is claimed is:

1. A truck cargo bed liner of unitary vacuum formed plastic having a base sheet with an under side for engagement with a truck cargo bed, comprising:
   a liner bottom;
   two liner wheel well covers formed at opposite sides of the liner bottom;
   a liner front wall connected to and extending upwardly from the liner bottom wall;
   two liner side walls connected to the liner bottom wall and wheel well covers, each liner side wall projecting upwardly from the liner bottom wall and adjacent wheel well cover; and
   wherein the base sheet has an under layer forming at least a portion of the under side of the base sheet, the under layer having an effectively high coefficient of friction; and
   wherein the base sheet has an upper layer having an effectively high coefficient of friction joined to an upper surface of the base sheet forming the liner.

2. The bed liner of claim 1, wherein the under layer is coextruded with the base sheet.

3. The bed liner of claim 1, wherein the under layer is laminated to the base sheet.

4. The bed liner of claim 1, wherein the under layer is joined to the base sheet by an adhesive.

5. The bed liner of claim 1, wherein the under layer is joined to the base sheet by thermal attachment.

6. The bed liner of claim 1, wherein the under layer is sprayed on the base sheet.

7. The liner of claim 1, wherein the under layer is discontinuous on the underside of the liner base sheet.

8. The liner of claim 1, wherein the under layer is substantially continuous on all of the underside of the liner base sheet.

9. The liner of claim 1, wherein the under layer has a thickness of not less than about ten thousandths of an inch.

10. The liner of claim 1, wherein the under layer is a composition including very low density polyethylene and high molecular weight high density polyethylene.

11. The liner of claim 1, wherein the under layer is a composition including about sixty percent very low density polyethylene and about forty percent high molecular weight high density polyethylene.

12. The liner of claim 1, wherein the under layer is a composition including polyolefin.

13. The liner of claim 1, wherein the under layer is a composition including polyolefin selected from the group consisting of:
   polyethylene;
   polypropylene;
   polybutylene; and
   polybutadiene.

14. The liner of claim 1, wherein the under layer is a composition selected from the group consisting of:
   isocyanates;
   carbamates; and
   ureas; and
   polymers and co-polymers thereof.

15. The liner of claim 1, wherein the under layer is a composition including about sixty percent very low density polyethylene and about forty percent polyolefin.

16. The liner of claim 1, wherein the under layer is a composition including polyolefin in a range of about 30 to 50 percent polyolefin.

17. The liner of claim 1, wherein the upper layer is coextruded with the base sheet and the under layer.

18. The liner of claim 1, wherein the upper layer has a thickness of not less than about forty thousandths of an inch.

19. The liner of claim 1, wherein the upper layer is a composition including very low density polyethylene and high molecular weight high density polyethylene.

20. The liner of claim 1, wherein the upper layer is a composition including about sixty percent very low density polyethylene and forty percent high molecular weight high density polyethylene.

21. The liner of claim 1, wherein the upper layer is a composition including polyolefin.

22. The liner of claim 1, wherein the upper layer is a composition including about sixty percent very low density polyethylene and about forty percent polyolefin.

23. The liner of claim 1, wherein the upper layer is a composition including polyolefin in a range of about 30 to 50 percent polyolefin.

24. The liner of claim 1, wherein the liner base sheet includes a high molecular weight high density polyethylene.

25. A truck cargo bed liner of unitary vacuum formed plastic having a base sheet with an under side for engagement with a truck cargo bed, comprising:

a liner bottom wall;

two liner wheel well covers formed at opposite sides of the liner bottom;

a liner front wall connected to and extending upwardly from the liner bottom wall;

two liner side walls connected to the liner bottom wall and wheel well cover and the liner front wall at opposite sides thereof, each liner side wall projecting upwardly from the liner bottom wall and adjacent a wheel well cover;

an under layer having an effectively high coefficient of friction, the under layer being a coextruded integrally formed layer on the under side of the base sheet; and an upper layer having an effectively high coefficient of friction, the upper laying being a coextruded integrally formed layer on the upper side of the base sheet.

26. A truck cargo bed liner of unitary vacuum formed plastic, comprising:

a liner bottom wall having an underside and an upper side;

a liner front wall connected to and extending upwardly from the liner bottom wall;

two liner side walls connected to the liner bottom wall, each liner side wall projecting upwardly from the liner bottom wall;

an under layer having an effectively high coefficient of friction, the under layer being integrally formed with the bottom wall and extending along the under side of the bottom wall; and an upper layer having an effectively high coefficient of friction, the upper layer being integrally formed with the bottom wall and extending along the upper side of the bottom wall.

* * * * *